US007183560B2

(12) United States Patent
Tahon et al.

(10) Patent No.: US 7,183,560 B2
(45) Date of Patent: Feb. 27, 2007

(54) STORAGE PHOSPHOR SCREENS HAVING HOMOGENEOUSLY INCORPORATED DOPANT (75) Inventors: Jean-Pierre Tahon, Langdorp (BE); Paul Leblans, Kontich (BE)

(73) Assignee: AGFA-Gevaert, Mortsel (BE)

( * ) Notice: Subject to any disclaimer, the term of this patent is extended or adjusted under 35 U.S.C. 154(b) by 156 days.

(21) Appl. No.: 11/049,445

(22) Filed: Feb. 2, 2005

(65) Prior Publication Data

US 2005/0184250 A1  Aug. 25, 2005

Related U.S. Application Data (60) Provisional application No. 60/552,046, filed on Mar. 10, 2004.

(30) Foreign Application Priority Data

Feb. 20, 2004  (EP)  ................................. 04100675

(51) Int. Cl.
*G03B 42/08*  (2006.01)

(52) U.S. Cl. ............ 250/484.4; 250/581; 252/301.4 R; 252/301.4 H (58) Field of Classification Search ............ 250/484.4, 250/483.1, 581, 583; 252/301.4 H, 301.4 R, 252/301.36
See application file for complete search history.

(56) References Cited

U.S. PATENT DOCUMENTS

| 5,534,191 | A | | 7/1996 | Hasegawa et al. ... 252/301.4 H |
| 5,693,254 | A | * | 12/1997 | Sieber et al. ........ 252/301.4 H |
| 5,736,069 | A | * | 4/1998 | Willems et al. ...... 252/301.4 H |
| 5,895,604 | A | | 4/1999 | Funabashi et al. ..... 252/301.44 |
| 6,228,286 | B1 | * | 5/2001 | Leblans et al. ...... 252/301.4 H |
| 6,730,243 | B2 | * | 5/2004 | Leblans et al. ...... 252/301.4 H |
| 6,802,991 | B2 | * | 10/2004 | Devenney et al. ... 252/301.4 H |
| 6,899,962 | B2 | * | 5/2005 | Iwabuchi et al. ............ 428/690 |
| 6,967,339 | B2 | * | 11/2005 | Leblans et al. ........... 250/484.4 |
| 6,977,385 | B2 | * | 12/2005 | Struye et al. .............. 250/484.4 |
| 7,029,819 | B2 | * | 4/2006 | Laney et al. ................. 430/139 |
| 2002/0017622 | A1 | | 2/2002 | Kohda ......................... 250/584 |
| 2002/0177156 | A1 | * | 11/2002 | Hosoi .............................. 435/6 |
| 2003/0034458 | A1 | | 2/2003 | Isoda et al. .............. 250/484.4 |
| 2003/0042429 | A1 | | 3/2003 | Isoda ....................... 250/484.4 |
| 2003/0047697 | A1 | | 3/2003 | Iwabuchi et al. ........... 250/584 |
| 2003/0186023 | A1 | | 10/2003 | Isoda et al. ................... 428/98 |
| 2003/0189179 | A1 | | 10/2003 | Leblans et al. .......... 250/484.4 |

FOREIGN PATENT DOCUMENTS

EP  0 174 875  3/1986

(Continued)

OTHER PUBLICATIONS

Patent Abstracts of Japan, 2002277591, published Sep. 25, 2002, corresponding to Appl. No. 2001075926 dated Mar. 16, 2001 to Konica Corp.

(Continued)

*Primary Examiner*—David Porta
*Assistant Examiner*—Faye Boosalis
(74) *Attorney, Agent, or Firm*—Joseph T. Guy; Nexsen Pruet, LLC (57) ABSTRACT Storage phosphor particles suitable for use in coated layers of stimulable phosphor screens or panels, in favor of high relative sensitivity, advantageously contain at the surface of the phosphor particles and in their inner volume, as components composing the said phosphor, a matrix component and a dopant or activator element that is homogeneously incorporated, wherein preference is given to particles having an aspect ratio of more than 2:1 and less than 50:1, said aspect ratio being defined as a ratio of 2 largest sizes of said particles, said sizes being taken in 3 dimensions perpendicular to each other, provided that one of said 2 largest sizes is smaller than 10 μm.

20 Claims, 3 Drawing Sheets

FOREIGN PATENT DOCUMENTS

| | | |
|---|---|---|
| EP | 1 113 458 | 7/2001 |
| EP | 1 316 970 | 6/2003 |
| EP | 1 316 971 | 6/2003 |
| EP | 1 316 972 | 6/2003 |
| EP | 1 341 188 | 9/2003 |
| EP | 1 347 460 | 9/2003 |
| EP | 1 349 177 | 10/2003 |
| EP | 1 355 322 | 10/2003 |
| EP | 1 359 204 | 11/2003 |
| EP | 1 376 614 | 2/2004 |
| WO | 01/03156 | 1/2001 |

OTHER PUBLICATIONS

Patent Abstracts of Japan, 2002250798, published Jun. 9, 2002, corresponding to Appl. No. 2001050107 dated Feb. 26, 2001 to Konica Corp.

European Search Report EP 04 10 0675, Apr. 29, 2004, Doslik.

* cited by examiner

STORAGE PHOSPHOR SCREENS HAVING HOMOGENEOUSLY INCORPORATED DOPANT

The application claims the benefit of US Provisional Application No. 60/552,046 filed Mar. 10, 2004.

FIELD OF THE INVENTION

The present invention relates to a method for preparing a storage phosphor having structured particles comprising a homogeneously distributed dopant or activator element, advantageously applied in a storage phosphor screen or panel.

BACKGROUND OF THE INVENTION

Storage phosphor screens are known in the art as screens wherein a latent X-ray image is stored when making use of a stimulable phosphor as a medium absorbing and storing radiation energy emitted by an X-ray source. Such X-rays, when having passed through an object (as e.g. a human body) provide the phosphor grains in the screen with a "latent image" which should be read out in order to make that "latent image" visible and ready for inspection by a medicine. Read-out of the X-ray image is achieved by exciting the phosphor with stimulating radiation (of longer wavelengths), thereby stimulating the phosphor to emit radiation of a shorter wavelength, which should be captured by a detector. Such a luminescent storage screen is disclosed, for example, in EP-A 0 174 875.

Holes become generated in the stimulable phosphor by incident radiant intensity, wherein these holes are stored in traps having a higher energy level, so that the latent X-ray image becomes stored in the screen, a process that seems to be very comparable with latent image formation in silver halide crystals in classical photography.

Processing however proceeds in a quite differing way: whereas in classical silver halide photography wet processing of a silver halide film material proceeds in a processing cycle throughout the steps of developing, fixing, rinsing and drying, processing of digital images requires read-out of the entire area or surface of a storage screen or panel: stimulation, pixel-by-pixel, by another radiation source, e.g. a laser, causes stimulated radiation to leave the storage panel and to be detected by a detector. Due to the stimulation radiation, the energy of the holes stored in the traps is boosted and they can fall back into lower energy levels, whereby the energy difference is radiated in the form of light quanta. The stimulable phosphor thereby emits light dependent on the energy stored in the phosphor. The light emitted as a result of this stimulation is detected and rendered visible, so that the x-ray image which was latently stored in the screen can be read out. A problem in the read-out of such screens is that the stimulable phosphor is not sufficiently transparent for the stimulating laser light. A minimum thickness of the stimulable phosphor is required to be able to achieve adequate X-ray quantum absorptions. In case however of a non-transparent, tightly compressed or sintered phosphor, the laser beam is so greatly attenuated by the phosphor that the penetration depth of the laser beam is too small. Because the energy is no longer adequate for boosting the holes to the energy level required for quantum emission, the information stored in the deeper levels cannot be read out and speed of the storage phosphor screen is reduced. Moreover as the storage phosphor particles are embedded in a binder, it is important that the said binder is made of a light-transmissive carrier material, fixing the phosphor grains. Transparency for both stimulation and stimulated radiation is thus required, in favor of speed as has been disclosed in EP-A 1 376 614. Besides its influence on speed, influence on sharpness of the captured image is another weakness: incident radiation indeed spreads increasingly with increasing penetration depth, due to scattering of the radiation beam at the phosphor grains, so that the modulation transfer function of the overall system is degraded. Providing a binderless stimulable CsBr:Eu phosphor, prepared as described in EP-A 1 203 394 and vapor-deposited in needle-shaped form as disclosed in EP-A 1 113 458 onto a carrier in a high vacuum, was forming a suitable solution for an excellent speed-to-sharpness balance.

As it was inevitable to have voids between the needles, further attempts to fill the said voids have more recently been described in EP-A's 1 316 970, 1 347 460, and 1 349 177, wherein filling voids has been realized by measures related with application of a radiation-curable protection layer liquid, a polymeric compound and sublimated dyes respectively. Filling the voids should be considered as an alternative for needle-shaped phosphors in order to avoid destruction of the needles by compression, as well-known applied technique for powder phosphors, in order to enhance their package density in a screen. It is not excluded that powder phosphors taking advantage with respect to speed by such compression action degrade with respect to sharpness as particle boundaries between powder particles may act as scatter centers for read-out radiation.

Further measures related with support or subbing layers onto said support, taken in favor of speed and sharpness for panels with same phosphors, have been described in recent EP-A's 1 316 972, 1 316 971 and 1 341 188.

Factors particularly related with intrinsic sensitivity of the phosphors are however, to a great extent, related with incorporation (volume distribution), amount and valency of the dopant or activator element. So it is clear that incorporation of divalent or trivalent Eu into a phosphor matrix structure composed of monovalent metal compound causes deformation of the prismatic phosphor crystalline structure.

So in U.S. application 2003/0047697 the Europium signal measured at the surface of the layer is larger than the Europium-activator signal measured in the bulk of the crystal layer. The surface of the phosphor is defined therein as "1% of the total thickness of the crystal layer". The problem is solved of "crack formation" in a layer of deposited alkali halide phosphors—by electron beam evaporation—and formation of undefined crystal face orientation in the layers, as a consequence of deformation of crystal lattice structures. A radiation image storage panel is claimed therein wherein both of the concentration of the activator component in the portion of from the bottom surface to depth of {fraction ($99/100$)} and the concentration of the activator component in the portion of from the upper surface to depth of {fraction ($1/100$)} satisfy, in a preferred embodiment, the condition of $0 \leq p/q < 0.1$, wherein p stands for the concentration in the portion of from the bottom surface to depth of {fraction ($99/100$)}, and q stands for the concentration in the portion of from the upper surface to depth of {fraction ($1/100$)}.

U.S. application 2003/0042429 further claims a relationship of a molar ratio of activator to mother component Ra in an optionally determined one position on the phosphor film and a molar ratio of activator element to mother component Rb in an optionally determined different position on the phosphor film, wherein said ratios are in between broad ratio values of 1:10 to 10:1, thereby providing a radiation image storage panel which shows specifically high sensitivity.

U.S. application 2003/034458 moreover claims presence as a Eu activator in a CsX containing phosphor crystal of amounts, expressed as an atomic ratio in the range from $10^{-4}$ to $10^{-2}$ in order to reach the highest sensitivity of the storage phosphor thus obtained.

U.S. application 2003/186023 in addition describes a process for preparing a radiation image storage panel comprising a support and a phosphor film comprising a stimulable europium activated cesium bromide phosphor, wherein said method comprises the steps of depositing on the support from the gas phase, europium activated cesium bromide in form of an aligned phosphor crystal layer; and heating the crystal layer in an annealing step following that vapor deposition step, in favor of providing a reproduced radiation image of a high quality with a high sensitivity.

From the considerations related with speed of storage phosphor panels given hereinbefore, it is clear that there remains a stringent demand for measures in order to further enhance sensitivity, while overcoming all probable losses in speed.

OBJECTS AND SUMMARY OF THE INVENTION

It is an object of the present invention to provide storage phosphor particles in of a storage screen of the type described above which produces a storage screen having a high X-ray quantum absorption with high imaging sharpness, an excellent modulation transfer function, and which is easy to manufacture.

The above object has been achieved in accordance with the present invention by providing storage phosphor particles, layers in which these particles are coated and a screen, sheet or panel comprising such layers as defined in the claims.

Characteristic for those phosphor particles, besides an improved incorporation of dopant (activator) in a matrix or mother crystal lattice compound, it is required, according to the present invention to provide structured phosphor particles that are characterized by an aspect ratio of more than 2, said aspect ratio being defined as a ratio of 2 largest sizes of said particles, said sizes being taken in 3 dimensions perpendicular to each other, provided that one of said 2 largest sizes is smaller than 10 μm (or otherwise explained: as ratio between said particles in dimensions thereof, wherein said dimensions are proportionally most differing.

More particularly an improved Europium doped alkali halide, and more particularly, a CsBr:Eu phosphor, is envisaged, wherein said Europium dopant or activator is present. Preferable phosphors having an aspect ratio of more than 2.0, originating from vapor-deposited needle-shaped phosphors and having an aspect ratio of less than 2 due to milling or grinding said phosphors, when coated in a binder layer, are superior in sensitivity if compared with globular particles having same chemical composition and corresponding volume.

The above-mentioned advantageous effects have thus been realized by providing storage phosphor particles, a storage phosphor layer and a storage phosphor sheet, screen or panel having the specific features set out in the claims. Specific features for preferred embodiments of the invention are set out in the claims dependent thereupon.

Further advantages and embodiments of the present invention will become apparent from the following description.

BRIEF DESCRIPTION OF THE DRAWINGS

FIG. 2B shows a photograph of structured needle-shaped phosphors, whereas

DETAILED DESCRIPTION OF THE INVENTION

It has been experimentally found that, according to the present invention a storage phosphor particle advantageously contains at its particle surface and its inner volume as components composing the said phosphor a matrix component $(1-x)M^{I}X.xM^{II}X_2$, wherein M(I) is at least one of monovalent Li, Na, K, Rb or Cs, M(II) is a divalent metal element selected from the group consisting of Mg, Ca, Sr, Ba and Ni;

and wherein $0 \leq x < 0.5$;

and an activator component Ln, wherein

Ln stands for Sc, Y, La, Ce, Pr, Nd, Pm, Sm, Eu, Gd, Tb, Dy, Ho, Er, Tm, Yb, Lu, Al, Bi, In or Ga, wherein said particle is characterized by an aspect ratio of more than 2:1, said aspect ratio being defined as a ratio of 2 largest sizes of said particles, said sizes being taken in 3 dimensions perpendicular to each other, provided that one of said 2 largest sizes is smaller than 10 μm.

In a preferred embodiment said aspect ratio is higher than 2:1, and even more preferably more than 5:1, but preferably not more than 50:1 and even most preferably not more than 10:1. For practical use a suitable compromise should however be sought between aspect ratio, a higher aspect ratio providing more sensitivity to the phosphor particles, and sharpness (SWR), said sharpness showing favor to lower aspect ratios, as both parameters are reacting in an opposite way while aspect ratios are changing.

Most important however, apart from considerations related with aspect ratios regarding speed and sharpness as "opponent parameters" is that a homogeneous distribution of activator or dopant element concentration over the volume of the matrix or mother component should be strived at, wherein such a homogeneity is preferably defined from measurement of concentration ratios calculated from measured of said concentration at the surface and at a depth of 5 μm respectively, for storage phosphor particles in a crystalline structured form selected from the group consisting of a block-shaped, a prismatic, and a needle-shaped form. Measurements of activator element partition should be performed as measurements of the activator element or dopant concentration to mother or matrix component concentration measured at a depth of 5 μm and measurements of activator element or dopant concentration to mother component concentration measured at the surface of such crystals. Those differences, divided by a difference in site depth of 5 μm, if expressed per μm, should, in absolute value, not exceed a value of 0.20, wherein the largest dimension of both dimensions should not exceed 500 μm and, even more preferably, not more than 100 μm, when present in non-aligned form onto a support in non-aligned form as a result of milling or grinding said phosphors, prepared before by making use of a vapor deposition process as will further be described hereinafter.

For storage phosphor particles according to the present invention, in a most preferred embodiment said matrix or mother component is CsBr and said activator or dopant element is Eu.

In an even more preferred embodiment in a storage phosphor particle according to the present invention said activator element is divalent Eu.

With respect to average amounts of dopant, the storage phosphor particle according to the present invention has said activator element present in an amount of at most 4000 p.p.m. versus said matrix component, more preferably at most 1000 p.p.m. and even more preferably in an amount in the range from 20 up to at most 700 p.p.m.

According to the present invention, even after having been milled or ground, the desired storage phosphor particles are in a structured form, selected from the group consisting of a block-shaped, a prismatic, a cylindrical and a needle-shaped form, wherein said aspect ratio is less than 50:1 (besides having an aspect ratio of more than 2:1 as requested hereinbefore). In an even more preferred embodiment, after milling or grinding said aspect ratio is less than 10:1.

Figure 1:
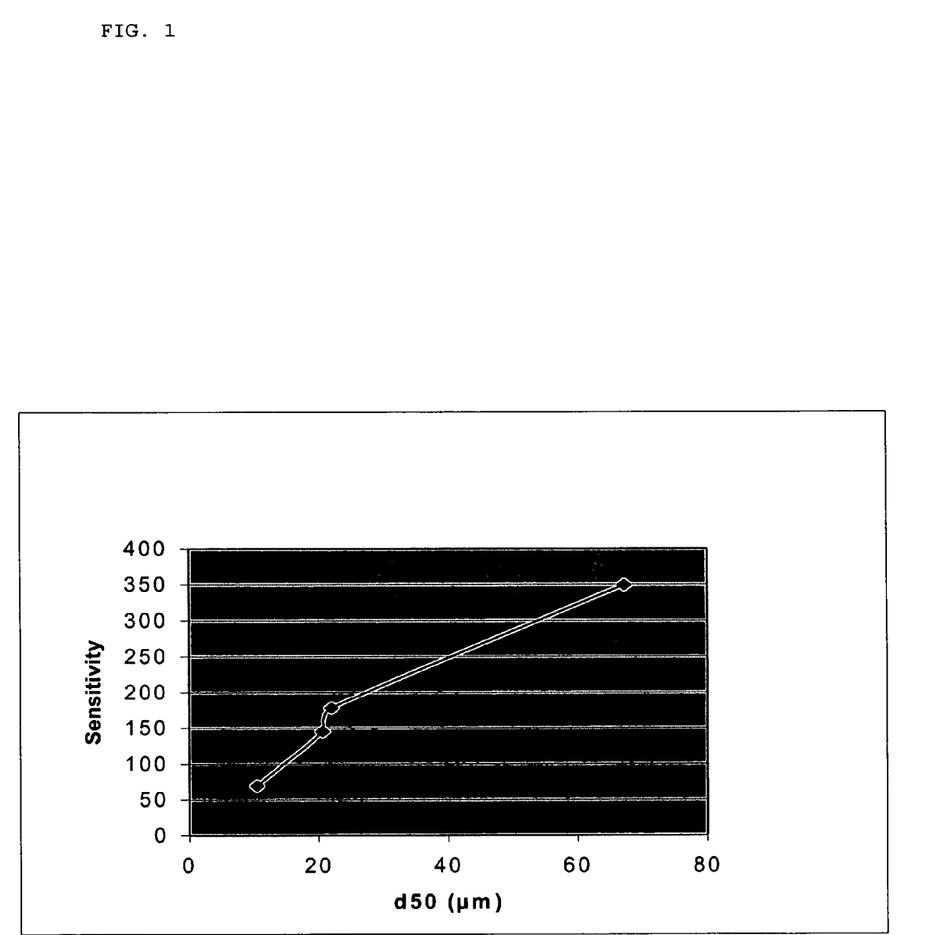
FIG. 1 shows the sensitivity as a function of average phosphor particle diameter.

So it has unambiguously been shown (see FIG. 1) that a homogeneous incorporation and distribution of dopant or activator element Eu in the structured CsBr:Eu phosphor crystals leads to a steep rectilinear increase of sensitivity for diameters of said phosphor crystals in the range of up to 20 µm, but that this increase declines once that average particle size (diameter) is surpassed.

CsBr:Eu phosphor particles are advantageously prepared according to following general receipt. As phosphor precursor components for the envisaged CsBr:Eu phosphor particles, CsBr and $EuBr_3$ present in the desired ratio amounts in order to provide the desired composition, are advantageously thoroughly mixed before firing in a crucible. Heating at a temperature T, at least equal to higher than the melting temperature $T_{melt}$ of the phosphor is performed. So the melting temperature of the matrix element CsBr is 640° C. and the mixture will melt at somewhat lower temperatures in the range of 570° C. In order to prevent sintering of the molten phosphor in the crucible, particles of $SiO_2$, alternatively $Al_2O_3$, are advantageously added to the phosphor mixture. Heating is further advantageously performed in a slightly reducing nitrogen atmosphere, under a reduced atmospheric pressure situated between 1 atm and $10^{-6}$ mbar, in order to get divalent Europium activator in the fired phosphor composition. Apart from nitrogen, other another inert gas may be used as e.g. Ar. A reducing atmosphere advantageously comprises hydrogen in minor amounts. After firing and cooling, an annealing step (e.g. by heating the phosphor up to e.g. about 170° C. for a time of e.g. 4 hours) is performed and thereafter the phosphor is ground or milled up to a desired average phosphor particle radius, so that the resulting CsBr:Eu phosphor particles are containing a homogeneously distributed activator or dopant compound in the lattice of the matrix or mother compound and an optimized sensitivity with respect to the average particle size diameter.

Furtheron a storage phosphor layer according to the present invention is provided, wherein said layer comprises storage phosphor particles as disclosed before. Whereas said particles in the coated layer thereof may be dispersed, in a preferred embodiment according to the present invention, said layer is binderless.

In another embodiment a storage phosphor layer according to the present invention comprises storage phosphor particles as dislosed before, wherein, in a preferred embodiment, said layer is transparent. Such a transparency is attainable, apart from making use of a binder having (about the) same refraction index as the phosphor particles or apart from vapor depositing said phosphor particles on a support, melting a layer composing said particles leads to transparent layers as well. Such transparency has e.g. been illustrated for powdery phosphors in EP-A 1 376 614, and for structured vapor-deposited phosphors in EP-Application No. 3104842, filed Dec. 19, 2003, as well.

According to another embodiment of the present invention in said storage phosphor layer said particles are present in a non-aligned arrangement. This means that, opposite to the arrangement of a vapor deposited phosphor layer wherein said phosphors are present in aligned parallel form, the phosphor particles, although still being structured an present in said layer in form of a block, a prism, a cylinder or a needle, are no longer in non-aligned form in the phosphor layer. A storage phosphor panel according to the present invention thus advantageously comprises a support and, on at least one side of said support, at least one storage phosphor layer having structured phosphor particles, present in non-aligned form in said phosphor layer.

In order to provide the desired sensitivity (and optimized relationship between particle size and attainable sensitivity) in the layers disclosed hereinbefore, the structured phosphor particles are thus ground or milled. Therefor it is necessary to start with a phosphor crystal wherein the preferred Eu activator element is present as divalent europium and wherein the said activator element is homogeneously present in the storage phosphor particle as otherwise unpredictable results regarding distribution of the Europium activator over the coated phosphor layers will appear. For the case of milled or ground phosphor needles as in the present invention, it is recommended to disperse the phosphors in a binder medium, so that a coated layer is provided.

Moreover according to the present invention a storage phosphor panel comprises at least one storage phosphor layer as disclosed hereinbefore on at least one side of a support. In a particular embodiment said layer, as also disclosed hereinbefore, is binderless and/or transparent.

A storage phosphor panel according to the present invention advantageously comprises at least one protective layer at the side of the storage phosphor layer farther from the support. Furtheron according to the present invention said storage phosphor panel comprises at least one intermediate layer between storage phosphor layer and support.

According to the present invention a radiation image storage phosphor plate or panel is provided, wherein said plate or panel comprises one or more dyes in an amount of from 1 µg/m² up to 1000 µg/m². In favor of image definition it is indeed recommended to further have a plate or panel, provided with dyes, as in U.S. Pat. No. 4,394,581 wherein a dye or colorant is added to the panel so that the mean reflectance of said panel in the wavelength region of the stimulating rays for said stimulating phosphor is lower than the mean reflectance of said panel in the wavelength region of the light emitted by said stimulable phosphor upon stimulation thereof. Just as in U.S. Pat. No. 4,491,736 more specifically an organic colorant may be added which does not exhibit light emission of longer wavelength than that of the stimulating rays when exposed thereto. Alternatively as in EP-A 0 165 340 and corresponding U.S. Pat. No. 4,675, 271 a storage phosphor screen showing a better image definition by incorporation of a dye is disclosed. An analogous effect brought about in phosphor layers of image storage panels by incorporation of dyes or colorants has further been described in EP-A 0 253 348 and in the corresponding U.S. Pat. No. 4,879,202 and in EP-A 0 288 038.

According to the present invention an image forming method for storing and reproducing a radiation image by making use of a radiation image storage phosphor panel as set forth hereinbefore advantageously comprises the steps of:

exposing said radiation image storage panel with radiation energy having passed through an object or having been emitted by said object and storing said radiation energy in form of a latent image on said image storage panel;

releasing the stored energy in form of light upon irradiation with stimulating rays of the visible or infrared region, thereby emitting light from the ultraviolet or visible wavelength region collecting said light released from the storage panel by light-collecting means and converting the collected light into a series of electric signals; and producing an image corresponding to the latent image from the electric signals.

While the present invention will hereinafter be described in connection with preferred embodiments thereof, it will be understood that it is not intended to limit the invention to those embodiments.

EXAMPLES

A. Preparation of the Phosphor Particle Sample from Homogenized Phosphor Powder CEBLA9403/01/1:

530 g CsBr powder and 1656 mg $EuBr_3$ solution (0.001 mol of $EuBr_3$) were mixed for 45 minutes in a Turbula apparatus from WAB, Switzerland.

The powder mixture was then heated in a nitrogen atmosphere to 575° C. for 6 hours. The powder was heated up in 60 minutes to 180° C. under vacuum and was brought in 2 hours from 180° C. to 575° C. (in the vicinity of the melting temperature). The fired powder was cooled during 30 minutes.

The powder was further warmed up in 30 minutes to 140° C. (annealing step) and heated in 2 hours from 140° C. to 575° C. (in the vicinity of the melting temperature).

Figure 2A:
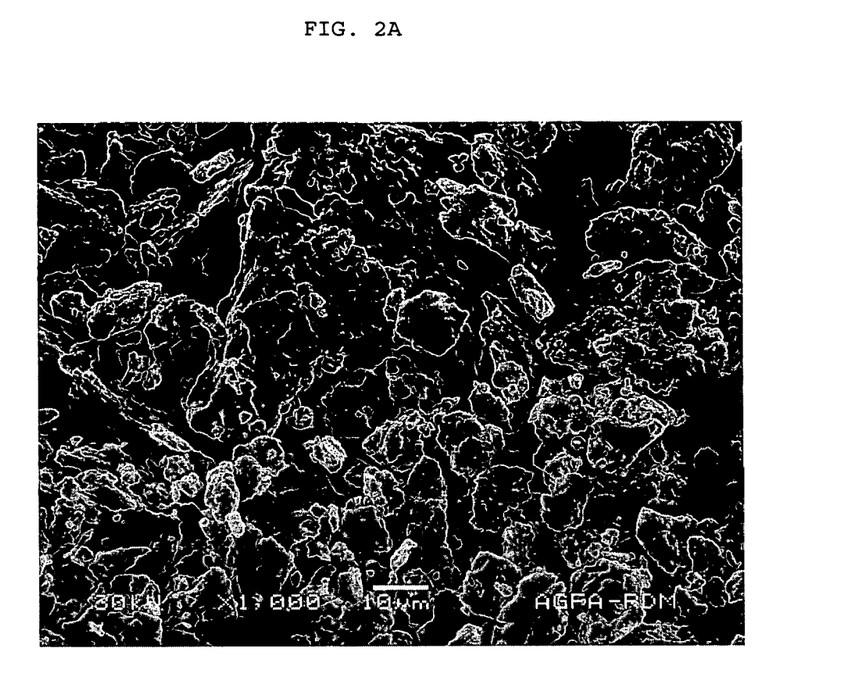
FIG. 2A shows less structured, non-needle, non-cylindrical, non-prismatic or block-shaped CsBr:Eu crystals.

An amorphous phosphor was obtained as shown on photograph of the phosphor particles (made by SEM-microscopy), FIG. 2A, after having milled by hand the CsBr:Eu phosphor particles thus obtained, (called CEBLA9403/01/1) in a mortar with inert 48 μm balls.

An average grain particle size of 12.65 μm was obtained for the particle size distribution, with a dispersity thereof of 0.65.

B. Preparation of the Phosphor Particle Sample from Homogenized Phosphor Needle-shaped Sample CB5911A:

Needle-shaped phosphors were prepared by a vapor deposition process in an Argon atmosphere at 700° C. on an anodized aluminum support.

The CB5911A phosphor was prepared in the presence of EuOBr (10 wt % versus the total amount used). The needle-shaped phosphor layer was annealed during 4 hours at 170° C.

Sensitivity was measured for both plates.

Adhesion at the aluminum support was perfect for the CB5911A needle-shaped phosphor.

After having been scraped off the needle-shaped layer from the aluminum support, the needles were milled by hand, just as was done before for the CEBLA9403/01/1.

Average grain sizes ($d_{50}$ in μm) were 14.01 μm with a dispersity factor $Q_d$ for the phosphor distribution of 0.51.

Covering amounts in mg per sq.cm, and sensitivity as powdered phosphor particles were also determined. Data have been summarized in Table 1 hereinafter: aspect ratios, calculated after milling by hand, have been added thereto.

Sensitivity was determined, referring to a reference sample MD10 (after X-ray exposure and photostimulation, and read-out in a SOLO® digitizer).

TABLE 1

|  | CB59511A | CB59511A/H | CEBLA9403/01/1 | CEBLA9403/01/1H |
|---|---|---|---|---|
| Covering amount | 130 mg/sq.cm | 58 mg/sq.cm | 250 mg/sq.cm | 250 mg/sq.cm |
| SOLO ® Sensitivity | 1035 | 273 | 273 | 22.9 |
| Particle size ($d_{50}$) |  | 14.01 μm | >60 μm | 12.65 μm |
| Dispersity $Q_d$ |  | 0.51 |  | 0.65 |
| Aspect ratio | — | >2.0 | — | <2.0 |

It is concluded from the Table 1 that loss in sensitivity by milling of physical vapor deposited, needle-shaped phosphors having an average aspect ratio of more than 2 is remarkably lower (about a factor of 4) than in case of milling powder phosphors having an average aspect ratio of less than 2, up to about the same average particle size with a comparable dispersity in their particle size distribution (sensitivity reduction with a factor of about 10).

The lower sensitivity obtained after milling of the CsBr:Eu powdery phosphors is interpreted to be due to an inhomogeneous distribution of divalent Eu activator in the CsBr matrix, synthesized by making use of a solid state gas reaction, as has been affirmed by TOFSIMS analysis. Moreover exhaustive milling of the large amorphous CsBr powders seems to cause a reduction of the top layer, rich in divalent Eu dopant.

Opposite thereto a lower loss in sensitivity of non-aligned, milled or ground needle-shaped CsBr:Eu crystals was observed, thanks to a more homogeneous distribution of divalent Europium dopant, prepared by evaporation. Moreover the milling process of the originally aligned needles while being deposited on a support by a vapor depostition process, already intrinsically slit in two of its three dimensions, is less drastic.

C. Preparation of the Phosphor Particle Sample from Homogenized Phosphor Needle-shaped Samples CB50512/K02AA/M and CB10305 7AA/A:

Needle-shaped phosphors were prepared by a vapor deposition process in an Argon atmosphere at 700° C. on an anodized aluminum support. Said phosphors were vapor deposited in aligned form in a binderless layer in needle-shape form.

The CB50512/K02AA/M phosphor was prepared in the presence of EuOBr (10 wt % versus the total amount used). The needle-shaped phosphor layer was annealed during 4 hours at 170° C. Adhesion at the aluminum support was perfect for the needle-shaped phosphor.

After having been scraped off the needle-shaped layer from the aluminum support, the needles were milled by hand, just as was done before for the CEBLA9403/01/1 and CB5911A samples.

The CB10305 7AA/A phosphor was prepared in the same way but instead of milling by hand, milling was mechanically performed with an Alpine Mill.

Average grain sizes ($d_{50}$ expressed in µm) were comparable for both milled needle shaped phosphors, with a lower dispersity factor for the mechanically milled phosphor (see results summarized in Table 2).

In Table 2 hereinafter aspect ratios, calculated after milling (manually and mechanically respectively), have been added thereto.

Sensitivity was again determined, referring to a reference sample MD10 (after X-ray exposure and photostimulation, and read-out in a NOLO® digitizer).

TABLE 2

|  | CB50512/K02AA/M | CB10305_7AA/A |
| --- | --- | --- |
| Coated layer thickness | 343 µm | 479 µm |
| NOLO ® Sensitivity | 80.3 | 6.2 |
| Particle Size ($d_{50}$) | 11.81 µm | 11.75 µm |
| Dispersity Qd | 0.47 | 0.37 |
| Aspect Ratio | >2.0 | >2.0 |
| Largest needle width | <10 µm | >10 µm |

It is concluded from the data in Table 2 hereinbefore that thorough milling of the needles by mechanical means like an Alpine Mill not only leads to a loss in sensitivity, but also makes the "largest width" of the needle phosphor particles increase by association or aggregation to a value exceeding 10 µm.

Figure 3A:
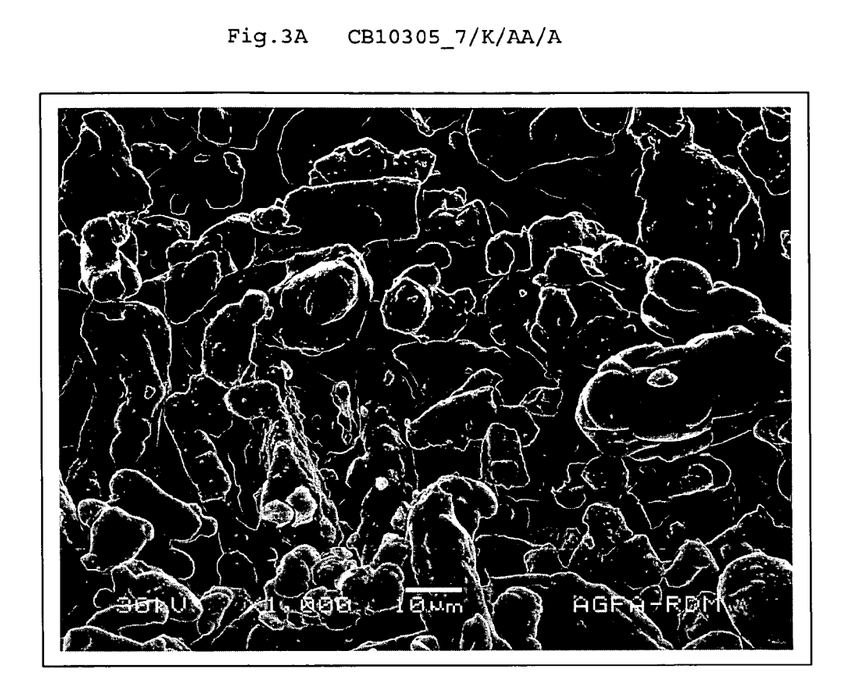
FIG. 3 shows pictures 3A and 3B taken from sample CB10305_7/K/AA/A, being illustrative for the aggregation appearing after mechanical Alpine Milling of needle-shaped phosphors.
Figure 3B:
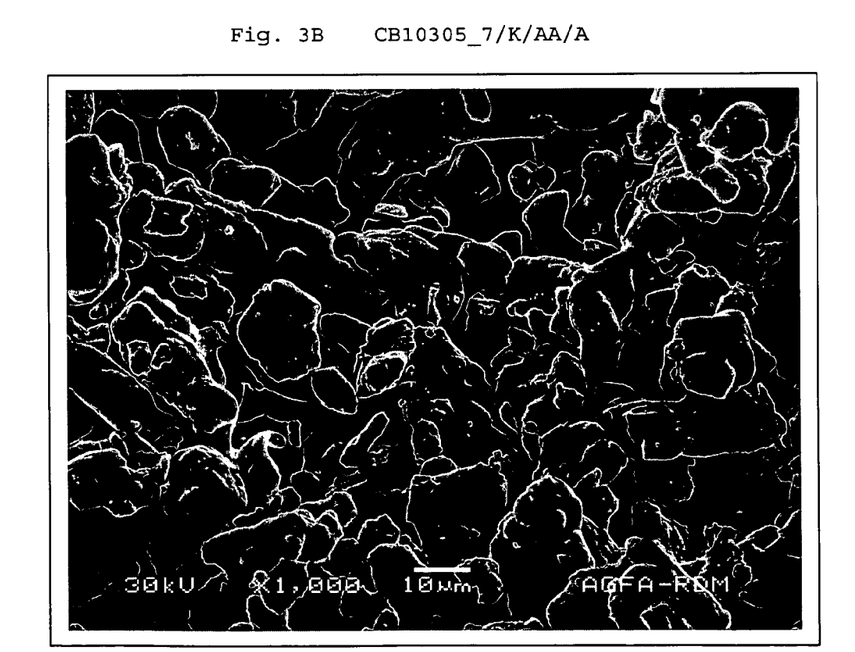

In the FIGS. 3A and 3B, pictures have been taken from sample CB10305_7/K/AA/A, as being illustrative for the aggregation appearing after Alpine Milling of the needle-shaped phosphors.

Figure 2B:
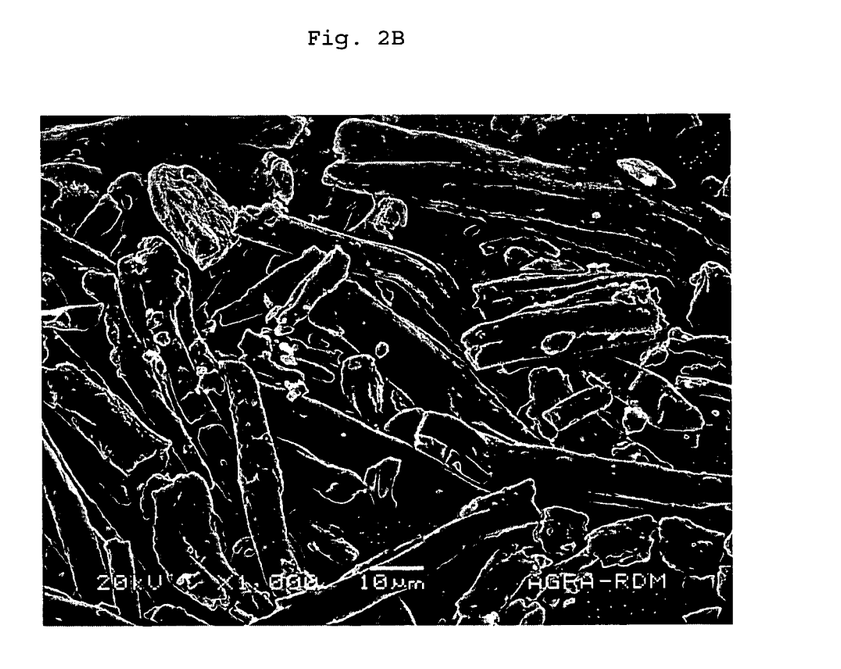

Opposite thereto manually, less thoroughly milled phosphor needles shown in FIG. 2B, although being coated in thinner layers than the mechanically (Alpine) milled phosphor crystals or particles shown in FIG. 3, clearly remain more sensitive than the Alpine milled crystals.

Aspect ratios are moreover higher than 2.0 and largest needle widths are smaller than 10 µm, according to the present invention (see FIG. 2B).

After thorough mechanical milling a lowered dispersity is calculated over the phosphor distribution of the phosphor particles shown in FIG. 3: although an aspect ratio of more than 2:1 is nevertheless maintained, sensitivity dramatically decreases and the largest needle width clearly exceeds a value of 10 µm, thus not corresponding to the desired phosphor particle dimensions as claimed.

Having described in detail preferred embodiments of the current invention, it will now be apparent to those skilled in the art that numerous modifications can be made therein without departing from the scope of the invention as defined in the appending claims.

What is claimed is:

1. Storage phosphor particle containing at its particle surface and its inner volume as components composing the said phosphor
    a matrix component (1-x)$M^IX.xM^{II}X_2$, wherein
    M(I) is at least one of monovalent Li, Na, K, Rb or Cs,
    M(II) is a divalent metal element selected from the group consisting of Mg, Ca, Sr, Ba and Ni;
    and wherein $0 \leq x < 0.5;$ and
    an activator component Ln, wherein
    Ln stands for Sc, Y, La, Ce, Pr, Nd, Pm, Sm, Eu, Gd, Tb, Dy, Ho, Er, Tm, Yb, Lu, Al, Bi, In or Ga,
    wherein said particle is characterized by an aspect ratio of more than 2.0, said aspect ratio being defined as a ratio of 2 largest sizes of said particles, said sizes being taken in 3 dimensions perpendicular to each other, provided that one of said 2 largest sizes is smaller than 10 µm.

2. Storage phosphor particle according to claim 1, wherein said matrix component is CsBr and wherein said activator element is Eu.

3. Storage phosphor particle according to claim 2, wherein said activator element is divalent Eu.

4. Storage phosphor particle according to claim 1, wherein said activator element is present in an amount of at most 4000 p.p.m. versus said matrix component.

5. Storage phosphor particle according to claim 1, wherein said activator element is present in an amount of at most 1000 p.p.m. versus said matrix component.

6. Storage phosphor particle according to claim 1, wherein said activator element is present in an amount in the range from 20 up to at most 700 p.p.m. versus said matrix component.

7. Storage phosphor particle according to claim 1, wherein said particle is in a structured form, selected from the group consisting of a block-shaped, a prismatic, a cylindrical and a needle-shaped form, wherein said aspect ratio is less than 50:1.

8. Storage phosphor particle according to claim 1, wherein said particle is in a structured form, selected from the group consisting of a block-shaped, a prismatic, a cylindrical and a needle-shaped form, wherein said aspect ratio is less than 10:1.

9. Storage phosphor layer comprising storage phosphor particles according to claim 1.

10. Storage phosphor layer according to claim 9, wherein said layer is a binderless layer.

11. Storage phosphor layer comprising particles according to claim 10, wherein said layer is transparent.

12. Storage phosphor layer according to claim 11, wherein said particles are present in a non-aligned arrangement.

13. Storage phosphor layer according to claim 10, wherein said particles are present in a non-aligned arrangement.

14. Storage phosphor layer comprising particles according to claim 9, wherein said layer is transparent.

15. Storage phosphor layer according to claim 14, wherein said particles are present in a non-aligned arrangement.

16. Storage phosphor layer according to claim 9, wherein said particles are present in a non-aligned arrangement.

17. Storage phosphor panel comprising at least one storage phosphor layer according to claim 16, on at least one side of a support.

18. Storage phosphor panel according to claim 17, wherein said panel comprises at least one protective layer at the side of the storage phosphor layer farther from the support.

19. Storage phosphor panel according to claim 18, wherein said panel comprises at least one intermediate layer between storage phosphor layer and support.

20. Storage phosphor panel according to claim 17, wherein said panel comprises one or more dyes in an amount of from 1 $\mu g/m^2$ up to 1000 $\mu g/m^2$.

* * * * *